Figure 1:
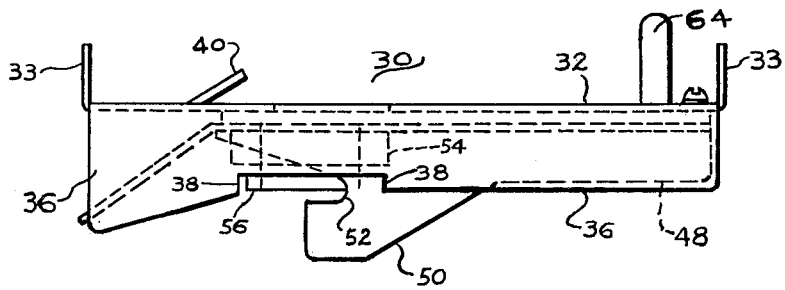

June 23, 1964 G. F. ERICKSON ETAL 3,138,165
COIN SEPARATORS

Filed June 13, 1960 6 Sheets-Sheet 1

INVENTORS
GUSTAV F. ERICKSON
FRANCIS T. VACCARO
JEROME BUDDENBAUM

BY Rey Eilers ATT'Y

June 23, 1964 G. F. ERICKSON ETAL 3,138,165
COIN SEPARATORS
Filed June 13, 1960 6 Sheets-Sheet 2
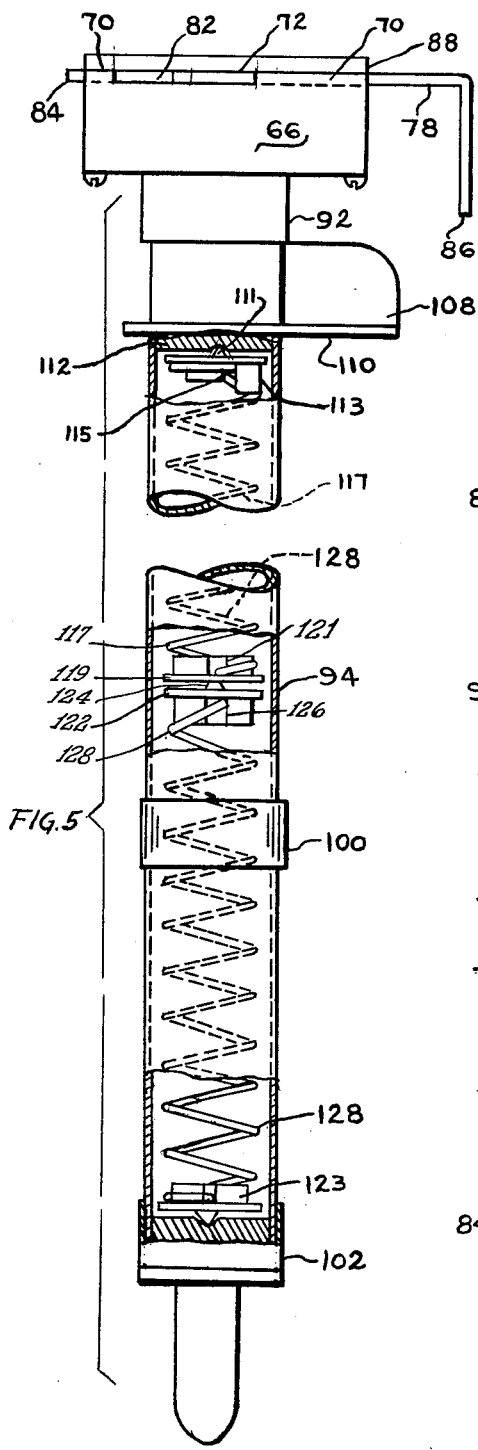
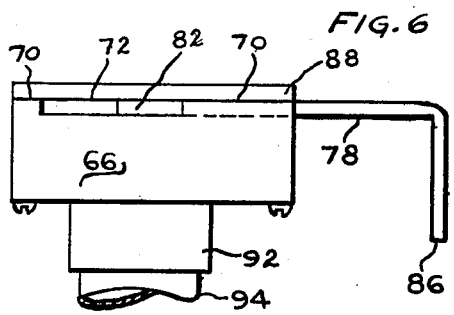
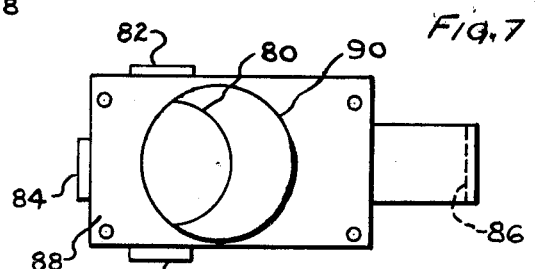
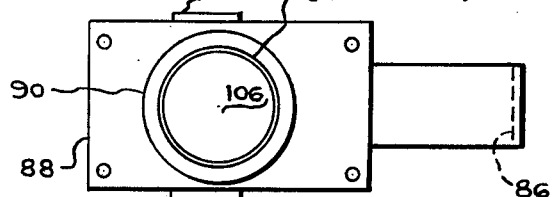
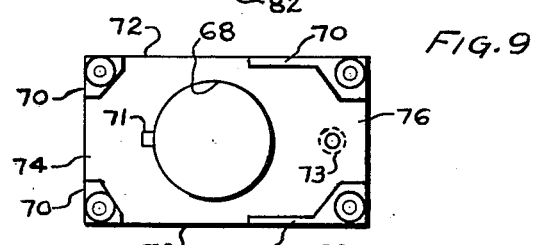
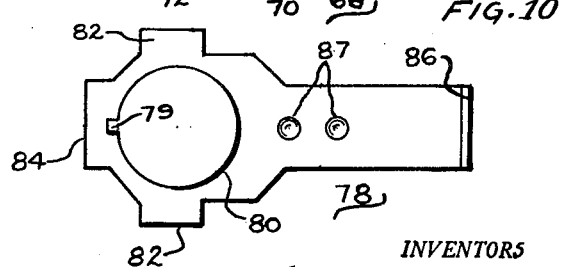
INVENTORS
GUSTAV F. ERICKSON
FRANCIS T. VACCARO
JEROME BUDDENBAUM
BY Rey Eilers ATT'Y

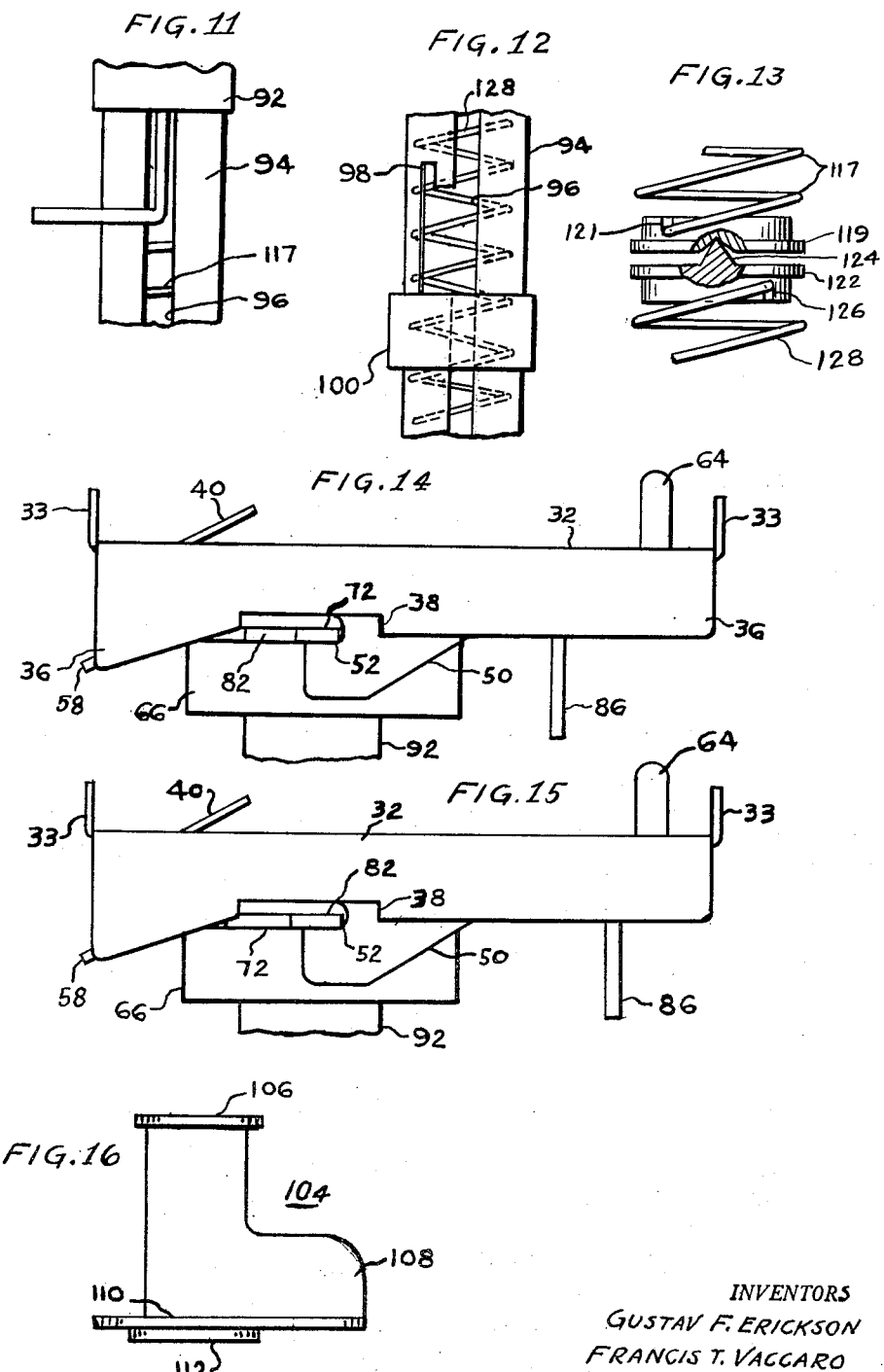

June 23, 1964   G. F. ERICKSON ETAL   3,138,165
COIN SEPARATORS
Filed June 13, 1960   6 Sheets-Sheet 4
FIG. 17
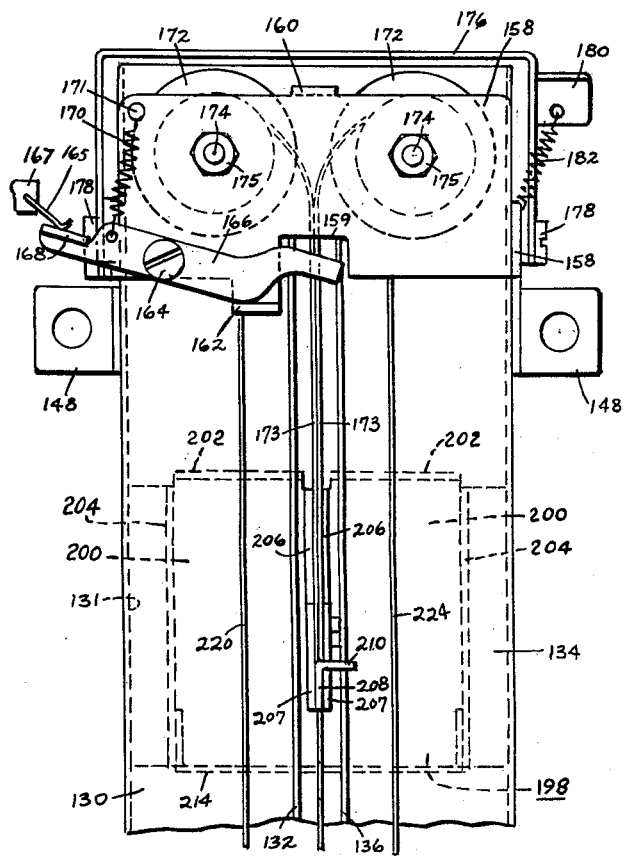
FIG. 18
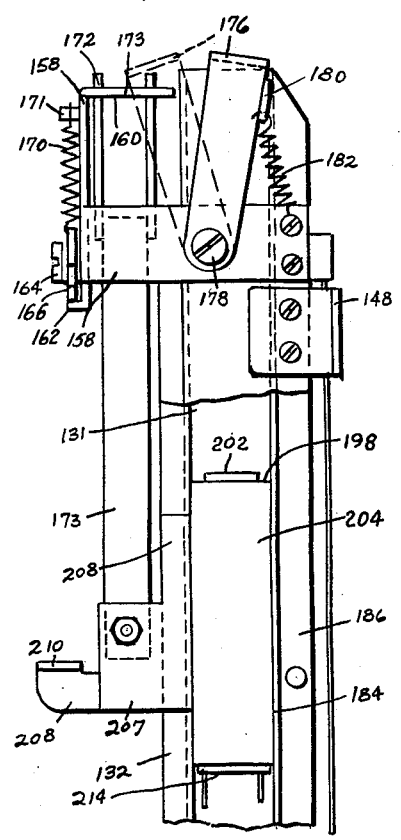
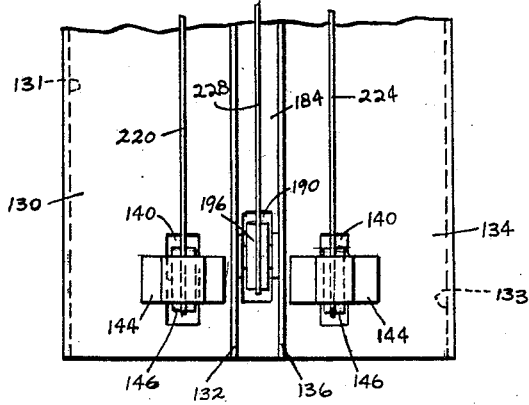
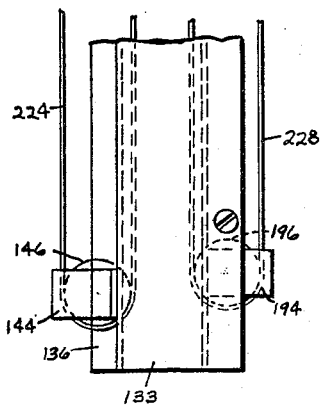
INVENTORS
GUSTAV F. ERICKSON
FRANCIS T. VACCARO
JEROME BUDDENBAUM
BY Rey Giles ATT'Y.

United States Patent Office
3,138,165
Patented June 23, 1964

3,138,165
COIN SEPARATORS
Gustav F. Erickson, Kirkwood, Francis T. Vaccaro, Pagedale, and Jerome Buddenbaum, Overland, Mo., assignors to National Rejectors, Inc., St. Louis, Mo., a corporation of Missouri
Filed June 13, 1960, Ser. No. 35,504
13 Claims. (Cl. 133—5)

This invention relates to improvements in coin separators. More particularly, this invention relates to improvements in money-dispensing devices.

It is therefore an object of the present invention to provide an improved money-dispensing device.

It is customary, in money-dispensing devices, to provide ejectors and to mount money storage tubes adjacent those ejectors. Those tubes supply coins or currency to those ejectors and those ejectors then dispense the required numbers of coins or currency. When the supply of coins or currency runs low, the operator usually reaches into the money-dispensing device and inserts further coins or currency into those tubes. In many cases, it is either awkward or inconvenient to reach into the money-dispensing device and insert further coins or currency, and, consequently, it would be desirable to provide a money storage tube that could be bodily inserted within or bodily removed from money-dispensing devices. Such a tube could be taken to a convenient place and filled and then re-inserted in the money-dispensing device. The prsent invention provides such a tube; and it is therefore an object of the present invention to provide a money storage tube which is bodily insertable within and is bodily removable from a money-dispensing device.

The money storage tube provided by the present invention has a closure that is biased into position to cover the outlet of that tube. That closure will automatically move into position to cover the outlet of that tube whenever that tube is bodily removed from the money-dispensing device. Further, that closure will automatically move into position to uncover that outlet whenever that tube is bodily inserted within the money-dispensing device. Such a tube and closure make it possible to handle that tube freely without any risk of losing money. Further, that tube and closure constitute a simple and effective receptacle in which to transport money. It is therefore an object of the present invention to provide a money storage tube which has a closure that automatically moves to cover the outlet of that tube whenever that tube is bodily removed from a money-dispensing device and that automatically moves to uncover the outlet of that tube whenever that tube is bodily inserted within a money-dispensing device.

Where coins are to be stored within a money storage tube, those coins will preferably be supported by a spring and will be urged upwardly toward the open upper end of that tube by that spring. Where a large number of coins are to be stored within that tube, the spring will have to be quite long; and such a spring will tend, as that tube is being filled, to rotate relative to that tube. That rotation is not always easy; and that rotation can be difficult where the spring is long and has a large cross section. The present invention facilitates the rotation of the spring within the storage tube by providing elements adjacent the ends of the spring which facilitate ready rotation of those ends. It is therefore an object of the present invention to provide elements adjacent the ends of a spring to facilitate the rotation of those ends.

Where bills are to be stored within a money storage tube, those bills will be rolled up and then inserted in tubes. Those enclosing tubes will be light in weight and will not be excessively strong. Such enclosing tubes must be kept from jamming because the forces that can be applied to jammed tubes could collapse those enclosing tubes. The present invention avoids any jamming of the enclosing tubes within the money storage tube by providing flexible cords that are attached to a vertically movable platform within the storage tube. Those cords hold the enclosing tubes out of engagement with the walls of the storage tube, and those cords move downwardly and upwardly with the supporting platform. In doing so, those cords facilitate the movement of the enclosing tubes relative to the storage tube. It is therefore an object of the present invention to provide a storage tube which has cords that space the enclosing tubes from the interior of the storage tube and which can move upwardly and downwardly relative to that storage tube.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

Figure 2:
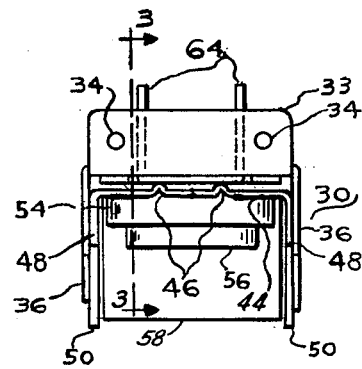
Figure 3:
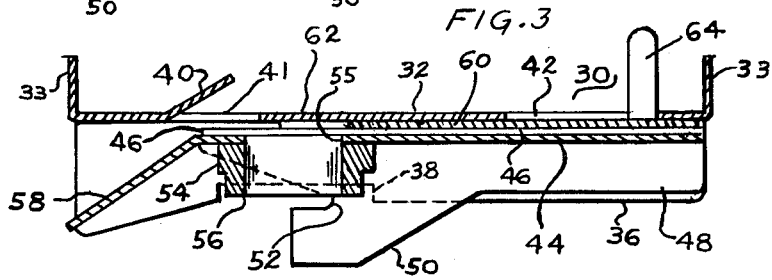
Figure 4:
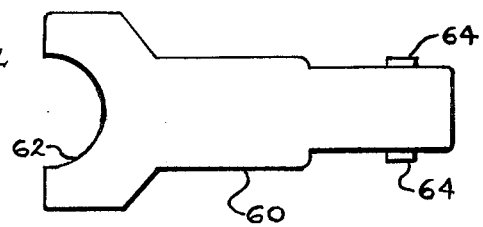
Figure 19:
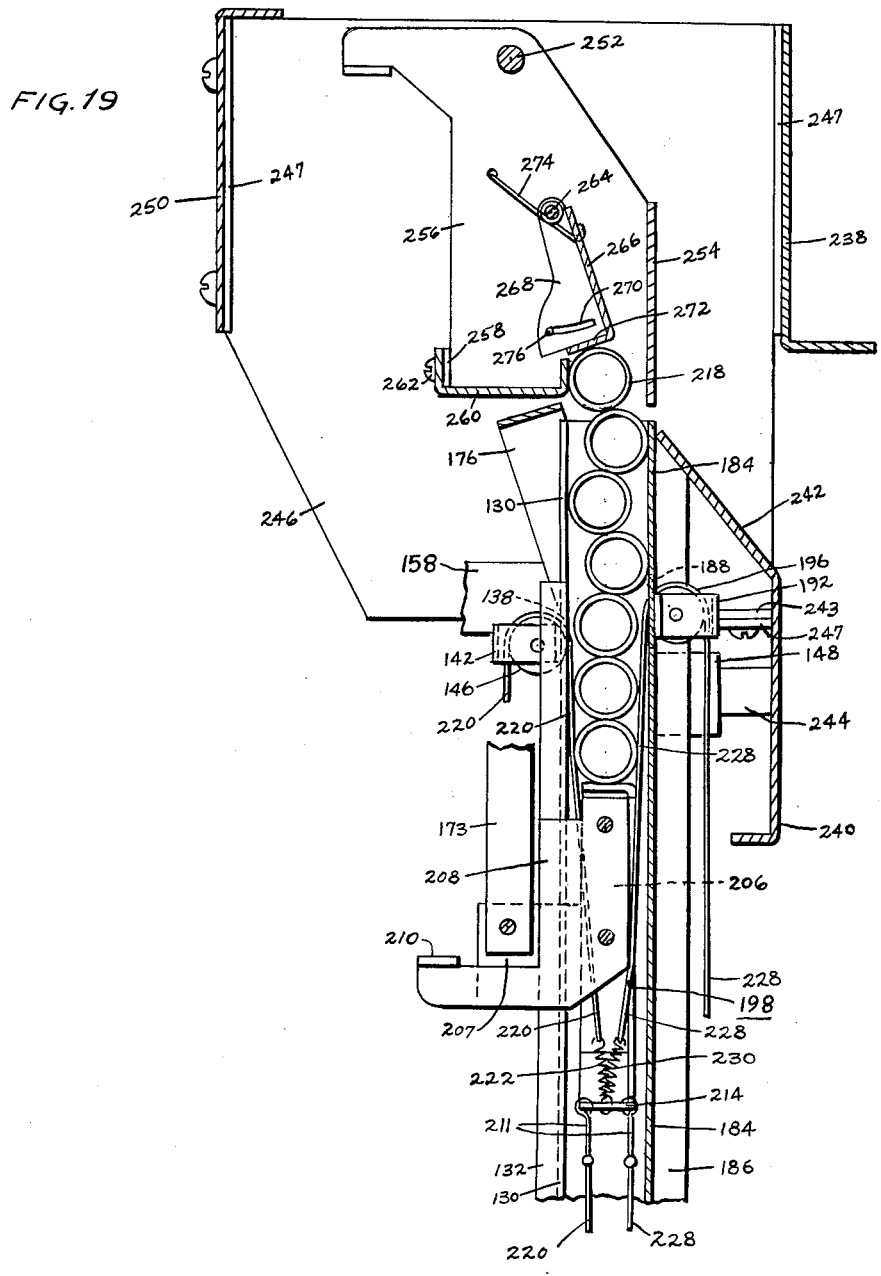
Figure 20:
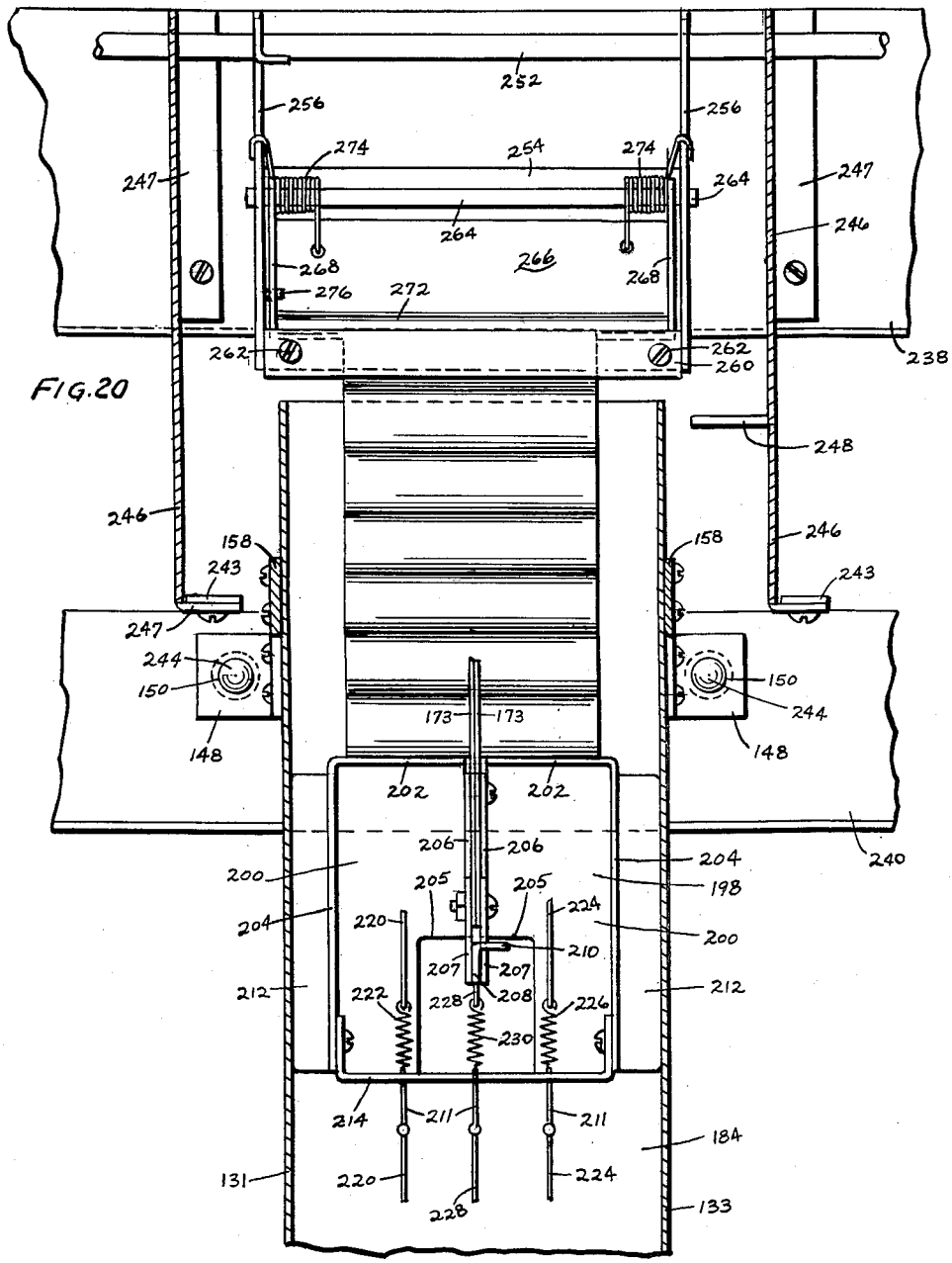

In the drawing, FIG. 1 is a side elevational view of a coin-ejecting assembly that is made in accordance with the principles and teachings of the present invention, FIG. 2 is a view of the right-hand end of the coin-ejecting assembly of FIG. 1, FIG. 3 is a longitudinal section through the coin-ejecting assembly of FIGS. 1 and 2, and it is taken along the plane indicated by the line 3—3 in FIG. 2, FIG. 4 is a bottom view of the ejector used in the coin-ejecting assembly of FIGS. 1–3, FIG. 5 is a partially-broken, partially-sectioned side elevational view of a coin storage unit that can be used with the coin-ejecting assembly of FIGS. 1–3, FIG. 6 is a side view of the upper part of the coin storage unit of FIG. 5, and it shows the latch of that coin storage unit in latching position, FIG. 7 is a plan view of the part shown in FIG. 6, and it shows the latch in un-latching position, FIG. 8 is a plan view of the part shown in FIGS. 6 and 7, and it shows the latch in latching position, FIG. 9 is a plan view of the part shown in FIGS. 6–8, but it shows that part before the cover plate and the latch have been assembled with that part, FIG. 10 is a bottom view of the latch used with the part of FIGS. 6–8, FIG. 11 is an elevational view of the upper end of the tube in FIG. 5, FIG. 12 is an elevational view of a lower section of the tube of FIG. 5, FIG. 13 is an elevational view, on a larger scale, of the springs disposed within the tube of FIG. 5, FIG. 14 is a side elevational view showing the coin-ejecting assembly of FIGS. 1–3 associated with the coin storage unit of FIG. 5, and it shows the latch in released position, FIG. 15 is a view similar to FIG. 14, but it shows the latch in latching position, FIG. 16 is a side elevational view, on a larger scale, of the platform used in the coin storage unit of FIG. 5, FIG. 17 is a broken, front elevational view of a storage tube for paper currency, FIG. 18 is a partially-sectioned, side view of the storage tube of FIG. 17, FIG. 19 is a partially-broken, partially-sectioned side view of a currency-ejecting assembly within which the storage tube of FIGS. 17 and 18 is mounted, and FIG. 20 is a partially-broken, partially-sectioned, front view of the currency-ejecting assembly and storage tube of FIG. 19.

Referring to FIGS. 1–16 in detail, the numeral 30 generally denotes a coin-ejecting assembly that can be mounted in a coin-dispensing device. That assembly includes a horizontally-disposed supporting plate 32 which has upwardly extending ears 33 at the ends thereof. Those ears have openings 34 therein, and those openings can receive fasteners which can secure the plate 32 in position within a coin-dispensing device. Flanges 36 are provided at the elongated sides of the plate 32, and those flanges depend downwardly from those sides. Notches 38, which are generally rectangular in elevation, are formed in, and extend upwardly from, the lower edges of the flanges 36. Those notches are spaced from the left-hand ends of the flanges 36 distances approximating one quarter of the length of one of those flanges. An ear 40 is bent upwardly out of the top of the plate 32 to provide an opening 41 in the top of that plate, and that ear is inclined from lower left to upper right. Two slots 42 also are formed in the top of the plate 32, and those slots extend longitudinally of that plate. As indicated by FIG. 3, those slots terminate short of the right-hand end of the plate 32 and terminate well short of the opening 41 in that plate.

The numeral 44 denotes the bottom plate of the coin-ejecting assembly 30; and that plate is provided with longitudinally-extending ridges 46 that project upwardly from the upper surface of that plate. Flanges 48 extend downwardly from the elongated sides of the plate 44, and those flanges are dimensioned to fit between and to closely engage the flanges 36 on the plate 32. The flanges 48 are provided with downwardly-directed extensions 50, and those extensions project downwardly below the bottom edges of the flanges 36 on the plate 32. A notch 52 is formed in each of the extensions 50, and those notches are contiguous with the notches 38 in the flanges 36 of the plate 32. A ring 54 is secured to the underside of the plate 44 and is concentric and contiguous with an opening 55 in the plate 44. The ring 54 has a reduced-thickness lower edge 56, as shown by FIGS. 2 and 3. The plate 44 also has a forwardly and downwardly inclined front edge 58.

The numeral 60 denotes an ejector plate which is flat, but which has upwardly-projecting ears 64. The ears 64 extend upwardly into and through the slots 42 in the plate 32. Those ears can be suitably engaged by actuators, not shown, to cause movement of the ejector plate 60 relative to the plate 32 and relative to the bottom plate 44. The leading edge 62 of the ejector plate 60 is concave, and that leading edge has a curvature complementary to that of the coins to be ejected. The ejector plate 60 will rest upon the ridges 46 on the plate 44 and will underlie the top plate 32. Suitable spacers, not shown, will be provided between the plate 32 and the plate 44 to hold those plates spaced apart a pre-determined distance. Further, suitable guide rollers, not shown, will be provided intermediate the plates 32 and 44 to guide the movement of the ejector plate 60.

Referring to FIGS. 5–9, the numeral 66 generally denotes a casting that has the form of a parallepiped. That casting has a cylindrical passage 68 through it, and that passage is vertically-directed. A discontinuous flange 70 is provided at the top of that casting, and that discontinuous flange defines a central recess in the top of that casting, and it also defines slots 72, 74 and 76. There are two slots 72; and they are oppositely disposed, as indicated particularly by FIG. 9. The slot 74 is at the left-hand end of the casing 66, and the slot 76 is opposite the slot 74. A small boss or abutment 71 extends upwardly from the recess in the top of the casting 66, and that boss is immediately adjacent the passage 68. A metal ball 73 is disposed within a socket in the upper face of the recess in the top of casting 66; and a spring, not shown, underlies that ball. The ball normally projects upwardly above the bottom of the recess, but the spring can yield to permit that ball to be moved down until its top is flush with that recess.

The numeral 78 generally denotes a latch which has an enlarged left-hand end; and that left-hand end fits within the recess defined by the discontinuous flange 70 at the top of the casting 66. That latch has two ears 82, and those ears fit within the slots 72 defined by the flange 70. The ears 82 are narrower than the slots 72 and hence those ears permit reciprocation of the latch 78 relative to the casting 66. An ear 84 extends outwardly through the slot 74 defined by the flange 70 on the casting 66, and the narrow right-hand end of the latch 78 extends through the slot 76 defined by that flange. The ear 84 and the narrow right-hand end of the latch 78 coact with the portions of the flange 70 which define the slots 74 and 76 to guide the reciprocation of the latch 78. The latch 78 has an opening 80 therein, and that opening has a diameter equal to the diameter of the passage 68 through the casting 66. A notch 79 is provided in the latch 78, adjacent the opening 80, and that notch is in register with the boss 71 in the recess of casting 66. A finger-receiving ear 86 is formed at the right-hand end of the latch 78, and that latch extends downwardly as shown by FIG. 5. The underside of the latch has two recesses 87, and those recesses can accommodate the upper surface of the ball 73.

The thickness of the latch 78 is slightly less than the depth of the recess in the top of the casting 66; and this means that when a confining plate 88 is suitably secured to the top faces of the discontinuous flange 70, the latch 78 will be free to move relative to that confining plate. That confining plate has an opening 90 therein, and that opening is larger than the opening 80 in the latch 78, as shown by FIG. 8. When the latch 78 is set in its left-hand position, as shown by FIG. 7, the center of that opening 80 is disposed to the left of the center of the opening 90 in the confining plate 88. However, when the latch 78 is set in its right-hand position, the openings 80 and 90 are concentric.

The numeral 92 denotes a sleeve which is secured to the casting 66 and which extends downwardly from the bottom face of that casting. That sleeve accommodates the upper end of an elongated storage tube 94 which is preferably rolled from a narrow metal plate. That tube has a vertically-directed narrow slot 96; and that slot extends the full length of that tube. A notch 98 is formed in the tube 94 adjacent the lower end of that tube; and that notch is contiguous with the slot 96, as shown by FIG. 12. A sleeve 100 encircles the tube 94 at a point immediately below the notch 98. A sleeve-like closure 102 is provided at the bottom of the tube 94; and that closure coacts with the sleeves 92 and 100 to strengthen and stiffen the tube 94. The closure 102 has a pin projecting downwardly from the bottom thereof.

Referring to FIG. 16, the numeral 104 generally denotes a coin-supporting platform that is telescoped within the tube 94. That platform has a circular plate 106 at the top thereof; and the diameter of that plate is slightly smaller than the inner diameter of the tube 94. A radially-extending ear 108 extends through the slot 96 of the tube 94, and that ear has a horizontally-directed, finger-receiving flange 110. That flange is curved to bend around, and to clear, the outer periphery of the tube 94.

A circular plate 112 is provided at the bottom of the platform 104, and the diameter of that plate is slightly smaller than the inner diameter of the tube 94. The plate 112 has a conical indentation in the bottom face thereof; and that indentation is at the center of that plate. That indentation accommodates a conical pivot 111 at the upper face of a rotatable element 113. That element has a reduced-diameter bottom and it has a notch 115 in that reduced-diameter bottom.

A helical compression spring 117 is disposed within the tube 94, and the upper turn of that spring encircles the reduced-diameter bottom of the rotatable element 113. In addition, the upper end of that spring extends into the notch 115 in that reduced-diameter bottom. In this way, the upper end and the upper turn of the spring 117 are kept from snagging or catching in the slot 96. The lower end of the spring 117 encircles the reduced-diameter upper end of a rotatable element 119; and the bottom end of that spring seats in a notch 121 in that reduced-diameter upper end. The bottom face of the rotatable element 119 has a conical indentation therein; and that rotatable element is dimensioned to fit within the tube 94.

The numeral 122 denotes a rotatable element that can also be telescoped within the tube 94. That element has a reduced-diameter bottom, and it has a conical pivot 124 at the upper face thereof. The reduced-diameter bottom of the element 122 telescopes within the top turn of a helical compression spring 128, and the top end of that spring is seated within the notch 126 in that reduced-diameter bottom. The conical pivot 124 extends into the conical indentation in the bottom of the rotatable element 119.

The bottom turn of the helical compression spring 128 telescopes over the reduced-diameter upper end of a rotatable element 123, and the bottom end of that spring seats in a notch in that reduced-diameter upper end. In that way, the lower turn and the lower end of the spring 128 will be kept from catching or snagging in the slot 96. The rotatable element 123 has a conical pivot on the bottom face thereof, and that pivot extends into a conical indentation in the upper face of the sleeve-like closure 102.

The element 113 will facilitate ready rotation of the upper end of the spring 117 relative to the tube 94 and relative to the platform 104. The element 119 will facilitate ready rotation of the lower end of the spring 117 relative to the tube 94 and relative to the rotatable element 122. This latter element, in turn, will facilitate ready rotation of the upper end of the spring 128 relative to the tube 94 and relative to the element 119. Further, the element 123 will facilitate ready rotation of the lower end of the spring 128 relative to the tube 94 and relative to the sleeve-like closure 102. In this way, ready and full rotation of the upper and lower ends of the springs 117 and 128 is assured.

With some light-weight springs, it is possible to dispense with the rotatable elements 119 and 122 and to use just one continuous spring. However, where quarters or half-dollars are to be dispensed, the springs will be so heavy that the rotatable elements 119 and 122 should be used.

The coin-ejecting assembly 30 will be suitably mounted within a coin-dispensing device; and springs and actuators will be associated with that assembly to cause reciprocating movement of the ejector plate 60. A suitable control device will also be provided to determine when, and how many, reciprocations of the ejector plate 60 should occur.

The casting 66, the latch 78, the confining plate 88, the tube 94, and the platform 104 constitute a readily portable unit. That unit can be selectively connected to the coin-ejecting assembly 30 or can be separated from the coin-ejecting assembly. To connect the unit of FIG. 5 to the assembly of FIG. 1, the user will first insert the elongated pin, at the bottom of the sleeve-like closure 102, within a locating opening in the bottom of the coin-dispensing device and will then move the casting 66 so the elongated sides thereof are below but in register with the downward extensions 50 on the bottom plate 44. As such time, the latch 78 will be in the left-hand position shown by FIGS. 5 and 7; and the opening 90 in the confining plate 88 will be below but in register with the reduced thickness lower edge 56 of the ring 54. Thereupon, the unit of FIG. 5 will be moved upwardly until the opening 90 telescopes upwardly over the reduced-thickness lower edge 56. That telescoping will precisely center the upper end of the unit of FIG. 5 relative to the coin-ejecting assembly 30.

As the unit of FIG. 5 was raised upwardly, the ears 82 on the latch 78 passed to the left of the downward extensions 50 on the flanges 48 of the plate 44; and when the opening 90 telescoped upwardly over the reduced-thickness edge 56 of the ring 54, the ears 82 automatically came to rest in register with the notches 52 in the downward extensions 50. Consequently, all that remains to be done to lock the unit of FIG. 5 to the assembly of FIG. 1 is to pull the latch 78 to the right. Thereupon, the ears 82 will be lodged within the notches 52 and will prevent accidental separation of the unit of FIG. 5 from the assembly of FIG. 1.

To separate the unit of FIG. 5 from the assembly of FIG. 1, it is only necessary to push the finger-receiving ear 86 on the latch 78 to the left, and then lower the unit of FIG. 5 downwardly and away from the assembly of FIG. 1. The movement of the latch 78 to the left will move the ears 82 out of the notches 52 in the downward extensions 50 of the flanges 48 on the bottom plate 44. Thereupon, those ears will permit the unit of FIG. 5 to be moved directly downwardly without any obstruction to that movement.

The ready removability of the unit of FIG. 5 is desirable because it is much easier to fill the tube 94 where that tube is wholly separated from the coin-dispensing device than it is to fill that tube where that tube is mounted within such a device. In loading the tube 94, the operator will press down on the finger-receiving ear 110 of the platform 104 and will thus move that platform down until it is close to the sleeve 100. He will then rotate that platform to place the ear 108 below and in register with the notch 98 in the tube 94. Thereafter, the operator will release the ear 110, and the springs 117 and 128 within the tube 94 will force the ear 108 up into the notch 98. The platform will thus be temporarily locked against upward movement relative to the tube 94. As a result, coins can be introduced into the tube 94 without requiring the operator to overcome the force applied by the springs 117 and 128.

Once the tube 94 has been filled, the latch 78 will be shifted to its left-hand position; and, at such time, the opening 80 in that latch will be out of register with the opening 90 in the confining plate 88 and will also be out of register with the passage 68 in the casting 66. As a result, the latch 78 will act to prevent the escape of the coins from the tube 94. At this time, the ear 110 on the platform 104 can again be moved downwardly, and then that platform can be rotated to move the ear 108 out of register to the notch 98 and into register with the slot 96. Subsequent release of the platform 104 will permit that platform to move upwardly and to act through the lowermost coin and the coins thereabove to force the stack of coins up against the bottom face of the latch 78. The unit of FIG. 5 is then ready to be bodily connected to the assembly of FIG. 1.

The opening 90 in the confining plate 88 will be telescoped over the reduced thickness edge 56 of the ring 54; and then the latch 78 will be moved to the right. That movement will lock the unit of FIG. 5 to the assembly of FIG. 1 by moving the ears 82 into the notches 52; and that movement will also move the opening 80 in the latch 78 into register with the opening 90 in the retaining plate 88 and into register with the passage 68 in the casting 66. At such time, the coins within the tube 94 will respond to the compressive forces within the springs 117 and 128 to move upwardly into engagement with the underside of the plate 32. The uppermost coin will be adjacent the concave leading edge 62 of the ejector plate 60; and it would only be necessary to move that ejector plate to the left to eject that uppermost coin. It will thus be apparent that as the unit of FIG. 5 was locked to the assembly of FIG. 1, the outlet end of the tube of that unit was automatically uncovered.

The present invention also provides substantially automatic covering of that outlet end when the unit of FIG. 5 is to be separated from the assembly of FIG. 1. Specifically, whenever the unit of FIG. 5 is to be separated from the assembly of FIG. 1, there will be a number of coins resting upon the plate 106 of the platform 104; and if the operator tries to shift the latch 78 to the left without first lowering those coins into the tube 94, the coin in the opening 80 of the latch 78 will abut the boss 71 of the casting 66 and positively block movement of the latch 78. The operator will then remember that he has not lowered the coins within the tube 94, and he will then do so by pressing downwardly on the ear 110. As soon as the coins are within tube 94, the operator can, and will, shift the latch 78 to the left, thereby covering the outlet end of the tube 94 as the unit of FIG. 5 is released from the assembly of FIG. 1.

Referring to FIGS. 17-20, the numeral 130 denotes an elongated, vertically-directed metal plate which has a rearwardly-extending flange 131 at the left-hand edge thereof. That plate also has a forwardly-extending flange 132 at the right-hand edge thereof. The numeral 134 denotes a metal plate which is elongated and vertically directed and which has a rearwardly-extending flange 133 at the right-hand edge thereof. That plate also has a forwardly-extending flange 136 at the left-hand edge thereof. The plates 130 and 134 have the front faces thereof lying in the same plane; and they have the flanges 132 and 136 thereof confronting each other but spaced apart a short distance to define a vertically-directed slot. The flanges 132 and 136 do not extend all the way to the tops of the plates 130 and 134, respectively; instead, those flanges terminate an inch or so below those tops.

An opening 138 is provided in the plate 130 adjacent the upper end thereof, and an opening 140 is provided in that plate adjacent the lower end thereof; and the openings 138 and 140 are in vertical alinement. Similar openings are formed in the plate 134, and those openings are at the same level as the corresponding openings in the plate 130. Bearing brackets 142 are secured to the front faces of the plates 130 and 134 adjacent the openings 138 in those plates. Similarly, bearing brackets 144 are secured to the front faces of the plates 130 and 134 adjacent the openings 140 at the bottoms of those plates. The bearing brackets 142 and 144 rotatably support small pulleys 146; and the rear faces of those pulleys extend through, and project short distances rearwardly of, the openings 138 and 140 in the plates 130 and 134.

The numeral 148 denotes brackets which are generally L-shaped in plan, and which have re-entrant portions that define vertically-directed slots. Alined openings 150 are provided in the re-entrant portions of those brackets, and those openings can telescope over fixed pins on a supporting structure. Resilient fasteners, not shown, are mounted within the re-entrant slots, and those fasteners can releasably seat in grooves in those pins. One bracket 148 is secured to the flange 131 of plate 130 and a second bracket 148 is secured to the flange 133. The brackets 148 are commercially-available elements, and they are not a part of the present invention.

The numeral 158 denotes a bracket that is U-shaped in plan; and the arms of that bracket abut and are suitably secured to the flanges 131 and 133 of the plates 130 and 134 respectively. A notch 159 is provided in the U-shaped bracket 158, and that notch extends upwardly from the lower edge of that bracket. That notch is in register with the slot defined by the flanges 132 and 136 on the plates 130 and 134, respectively, as shown by FIG. 17. An ear 160 is provided on the upper edge of the U-shaped bracket 158, and that ear extends toward the front faces of the plates 130 and 134. An L-shaped extension 162 extends downwardly and forwardly from the lower edge of the U-shaped bracket 158; and, as indicated by FIG. 17, the L-shaped extension 162 is disposed to the left of the slot defined by the flanges 132 and 136 on the plates 130 and 134, respectively.

A pivot 164 is secured to the U-shaped bracket 158 adjacent the left-hand edge of that bracket, and that pivot rotatably supports a lever 166. That lever has an upwardly-offset right-hand portion, and that portion is in register with the upper end of the slot defined by the flanges 132 and 136 on the plates 130 and 134, respectively. The lever 166 has an ear 168 at the left-hand end thereof, and that ear projects beyond the left-hand edge of the U-shaped bracket 158. A helical extension spring 170 has its lower end hooked through an opening in the lever 166 and has its upper end hooked around a pin 171 on the U-shaped bracket 158. The spring 170 biases the lever 166 for rotation about the pivot 164 in the clockwise direction. The ear 168 underlies actuator 165 of an empty switch 167; and that actuator will be biased downwardly against that ear.

The L-shaped extension 162 constitutes a stop for the clockwise rotation of the lever 166; and whenever that lever rests against that stop, the ear 168 will raise the actuator 165 and open the empty switch 167. However, whenever the lever 166 is rotated to a generally horizontal position, as will be the case whenever the currency storage unit is empty, the actuator 165 will be permitted to move downwardly to close the switch 167. This arrangement is desirable because that switch would also be closed if the currency storage unit were removed and not replaced, because there would then be nothing to hold the actuator 165 in its raised, switch-opening position. In this way, the lever 166 and the switch 167 clearly indicate when an adequate supply of currency is not available.

The numeral 172 denotes rotatable spools that support negator springs 173; and those spools are mounted intermediate the U-shaped bracket 158 and the front faces of the plates 130 and 134. Fasteners 174 are secured to the pivots for the spools 172, and those fasteners extend forwardly through openings in the U-shaped bracket 158. Those fasteners are held in position relative to that U-shaped bracket by nuts 175; and those fasteners fixedly secure the pivots of the negator springs 173 to the U-shaped bracket 158 while leaving the spools 172 free to rotate.

The number 176 denotes a U-shaped member that constitutes a closure for the currency storage tube of FIGS. 17 and 18. The arms of that member 176 extend downwardly along the outer faces of the flanges 131 and 133 on the plates 130 and 134, respectively; and those arms are disposed outwardly of the arms of the U-shaped bracket 158. Pivots 178, shown in the form of screws, telescope through openings in the arms of the U-shaped member 176 and seat in threaded openings in the arms of the U-shaped bracket 158. An ear 180 is provided on one of the arms of the U-shaped member 176, and that ear has an opening therein. A helical extension spring 182 has the upper end thereof hooked through the opening in the ear 180 and has the lower end thereof suitably secured to a fastener on the adjacent arm of the U-shaped bracket 158. That spring biases the closure 176 to the solid-line position shown by FIG. 18; but that spring can yield to permit that closure to be rotated to the dotted-line position shown by that figure.

The numeral 184 denotes a vertically-directed, elongated plate which constitutes the rear wall of the currency storage tube of FIGS. 17 and 18. That plate has flanges 186 which extend rearwardly from the sides of that plate, and those flanges abut the inner faces of the flanges 131 and 133 on the plates 130 and 134, respectively. Suitable fasteners extend through the openings in the flanges 131 and 186 and 133 and 186 to rigidly secure the plates 130 and 134 to the rear wall 184. The plates 130 and 134 coact with the wall 184 to provide a rigid currency storage tube that has a slot in the front thereof.

An opening 188 is provided in the wall 184 adjacent the top of that wall, and an opening 190 is provided in that wall adjacent the bottom of that wall. The openings 188 and 190 are in vertical registry, and they are close to the vertically-directed center line of the wall 184. A bearing bracket 192 is secured to the wall 184 adjacent the opening 188, and a bearing bracket 194 is secured to the wall 184 adjacent the opening 190. Those bearing brackets rotatably support small pulleys 196, and they support those pulleys so that forward edges thereof extend forwardly through the openings 188 and 190 in the wall 184.

The numeral 198 generally denotes a platform that is disposable within the currency storage tube defined by the plates 130 and 134 and by the wall 184. That platform includes two vertically directed plates 200; and each of those plates has a forwardly-extending top flange 202 and has a forwardly-extending side flange 204. The lower part of each plate 200 is cut-away, as at 205; and the cut-away portions 205 are adjacent each other. The adjacent side edges of the plates 200 are bent forwardly to form confronting, vertically-directed flanges 206; and those flanges have forwardly-extending off-sets 207 thereon.

A generally L-shaped plate 208 is disposed between the flanges 206 and between the off-sets 207. That plate has a horizontally-directed ear 210 which projects forwardly beyond the front edges of the offsets 207. The top of that ear is disposed below the level of the tops of the off-sets 207, and the top of the plate 208 is disposed below the level of the tops of the flanges 206. Suitable fasteners, shown as bolts and nuts, rigidly secure the plates 200 to the plate 208.

The side flanges 204 have vertically-directed bearing blocks 212 secured to their outer faces. Those bearing blocks are preferably made of nylon or some other plastic material that is hard but that has a smooth surface with a low coefficient of friction. Those blocks extend forwardly and rearwardly of the flanges 204, and thus space the plates 200 from the interior surfaces of the currency storage tube. Suitable fasteners, not shown, extend through the flanges 204 and into threaded sockets in the bearing blocks 212.

A bottom plate 214 has upwardly extending ears at the opposite ends thereof; and those ears abut the lower portions of the inner faces of the flanges 204. Suitable fasteners are used to secure the bottom plate 214 to the flanges 204 of the plates 200. The bottom plate 214 has openings, not shown, therein which can accommodate hooks 211 and has further openings, not shown, therein which can accommodate the lower ends of helical extension springs 222, 226 and 230. The hooks 211 are secured to the upper ends of flexible cords 220, 224, and 228; and those hooks secure those upper ends to the bottom plate 214. The springs 222, 226 and 230 are secured to the lower ends of the cords 220, 224 and 228, respectively; and those springs secure those lower ends of those cords to the bottom plate 214.

The bearing blocks 212 have their outer faces spaced apart a distance that is just slightly less than the distance between the inner faces of the flanges 131 and 133 on the plates 130 and 134 respectively. As a result, those bearing blocks limit sideways movement of the platform 198 relative to the currency storage tube. The front and rear faces of the bearing blocks 212 are closely adjacent the inner faces of the plates 130 and 134 and are closely adjacent the inner face of the wall 184 and hence those bearing blocks limit forward and rearward movement of the platform 198 relative to the currency storage tube.

The top flanges 202 constitute a vertically-movable, horizontally-directed supporting surface within the currency storage tube. The top of the plate 208 extends forwardly through the slot defined by the flanges 132 and 136 to underlie the ear 160 on the U-shaped bracket 158; and that top will coact with that ear to limit upward movement of the platform 198 relative to the currency storage tube. The offsets 207 extend forwardly through the slot defined by the flanges 132 and 136, and the upper edges of those off-sets underlie the right-hand end of the lever 166. Whenever the platform 198 is at the upper limit of its vertical path of reciprocation, the upper edges of the off-sets 207 will rotate the lever to a substantially horizontal position. The ear 210 will project forwardly beyond the offsets 207 and can receive a finger or a thumb of the operator whenever the operator wishes to move the platform downwardly within the currency storage tube.

The flexible cords 220 and 224 incline forwardly and upwardly from the upper ends of the springs 222 and 226; and those cords will pass forwardly of the flanges 202 at the tops of the plates 200 and then extend up to and over the pulleys 146 held by the bearing brackets 142. Those cords will pass outwardly through the openings 138 and will then pass downwardly adjacent the outer faces of the plates 130 and 134 until they reach the pulleys 146 held by the bearing brackets 144. Those cords will then pass inwardly through the openings 140 and will finally pass upwardly to the point where the hooks 211 can secure those cords to the bottom plate 214 of the platform 198. The cord 228 will incline rearwardly and upwardly from the spring 230 which is secured to the bottom plate 214, and that cord will pass rearwardly of the plate 208 and then extend up to and over the pulley 196 held by the bearing bracket 192. That cord will pass rearwardly through the opening 188 and then pass downwardly adjacent the rear face of the wall 184 until it reaches the pulley 196 held by the bearing bracket 194. The cord 228 will then pass forwardly through the opening 190 and finally pass upwardly to the point where a hook 211 can secure that cord to the bottom plate 214 of the platform 198.

The pulleys 146 and 196 coact with the flanges 202 on the plates 200 to hold the cords 220 and 224 adjacent, but out of engagement with, the inner faces of the plates 130 and 134 and to hold the cord 228 adjacent, but out of engagement with, the wall 184. The cords 220, 224 and 228 will define an area which can accommodate a series of vertically-stacked dispensing tubes 218; and that area will preferably be somewhat wider than the diameters of those tubes. The cords 220, 224 and 228 will be kept taut by the springs 222, 226 and 230, respectively, and those cords will hold the dispensing tubes 218 out of engagement with the inner surface of the currency storage tube. The dispensing tubes 218 are thus given resilient three-point support and are kept from jamming within the currency storage tube. The cords 220, 224 and 228 move with the platform 198, and hence the dispensing tubes 218 do not have to slide or slip relative to an adjacent surface until those tubes move upwardly beyond the upper limits of the cords 220, 224 and 228.

The bearing brackets 142 are set at the same level, but the bearing bracket 192 is set at a slightly higher level, as shown by FIG. 19. This is desirable because it keeps the inner faces of the pulleys 146 and 196 from narrowing down the area through which the dispensing tubes 218 must pass. In this way, the present invention assures jam-free raising of the dispensing tubes 218 to the upper end of the currency storage tube.

The Negator springs 173 extend downwardly from the spools 172, and those springs are disposed adjacent the slot defined by the flanges 132 and 136 on the plates 130 and 134, respectively. The lower ends of those springs are secured to the off-sets 207 of the platform 198; and those springs provide a substantially constant upward bias on the platform 198. However, those springs can yield to permit that platform to be moved downwardly toward the bottom of the currency storage tube.

The dispensing tubes 218, in which the paper currency is folded and held, are light in weight and are fragile. Consequently, it is important that those tubes not be subjected to heavy compressive forces. Yet the platform 198 must be urged upwardly toward the top of the coin storage tube with sufficient force to assure prompt and full upward movement of that platform. The present invention supplies the requisite force and yet avoids crushing of the dispensing tubes by utilizing Negator springs which provide a force that is less than the forces which can crush those tubes.

The currency storage tube defined by the plates 130 and 134 and by the wall 184 can accommodate almost fifty dispensing tubes, and thus can store up a sizeable amount of money. However, the amount of money that is so stored is not limitless; and hence the off-sets 207 are arranged to engage and rotate the lever 166 whenever the platform 198 reaches the upper end of the currency storage tube. Such rotation will enable the empty switch 167 to illuminate a suitable "Empty" lamp.

The dispensing tubes 218 are necessarily bulky as compared to coins; and hence those tubes occupy a large volume. Consequently, it is necessary to utilize substantially the entire internal volume of the currency storage tube for the storing of the dispensing tubes. The present invention makes substantially the entire internal volume of the currency storage tube available for the storing of the dispensing tubes 218 by locating spring 173 outside of that tube.

The currency storage tube of FIGS. 17 and 18 conveniently and fully protects and stores currency; and that tube is readily portable. That tube can be bodily assembled with and can be bodily separated from a currency-dispensing device. One such currency-dispensing device is shown by FIGS. 19 and 20.

That currency-dispensing device includes a horizontally-extending frame member 238 that is L-shaped in cross section. A second horizontally-extending frame member is denoted by the numeral 240; and that member has an upwardly and rearwardly inclined surface 242. Ears 243 are provided on the frame member 240, and those ears extend rearwardly from that frame member in a generally-horizontal direction. Two pins 244 extend rearwardly from the frame member 240; and the rear ends of those pins are grooved and are of reduced diameter. Those reduced diameter rear ends are dimensioned to telescope within the openings 150 in the L-shaped brackets 148 on the currency storage tube of FIGS. 17 and 18. The grooves in those pins will releasably hold the resilient fasteners used with those brackets.

The numeral 246 denotes plates that extend transversely of the frame members 238 and 240. Those plates have flanges 247 at the front, rear and bottom edges thereof. The front flanges 247 abut and are secured to the frame member 238, and the bottom flanges 247 are secured to the ears 243. The rear flanges 247 abut and are secured to a rearwardly-disposed, horizontally-directed frame member 250. The plates 246 coact with the frame members 238, 240 and 250 to provide a sturdy, rigid and stationary frame for the currency-dispensing device. A pin 248 is secured to the left-hand face of the right-hand plate 246 in FIG. 20; and that pin will be in register with and will be engaged by the ear 180 on the closure member 176 of the currency storage tube of FIGS. 17 and 18.

The numeral 252 denotes an elongated pivot that extends through openings in the plates 246. That pivot rotatably supports a large U-shaped member that has a front plate 254 and has rearwardly-extending flanges 256 at the ends of that plate. The pivot 252 extends through openings adjacent the tops of the flanges 256. A generally U-shaped closure 260 underlies the rearmost portions of the flanges 256; and that closure is secured to ears 258 on those flanges by fasteners 262, such as screws. The flanges 256 are spanned by a pivot 264; and while that pivot extends through those flanges, that pivot does not engage the plates 246.

A plate 266 has flanges 268 at the opposite ends thereof, and those flanges have openings which accommodate the pivot 264. The plate 266 also has a bottom flange 272. A slot 270 is provided in one of the flanges 268, and that slot accommodates pin 276 that is held by the adjacent flange 256 of the U-shaped member. Two springs 274 encircle the pivot 264 and bear against the plate 266 while also bearing against the flanges 256. Those springs bias the plate 266 for rotation about the pivot 264 in the counter clockwise direction, as that plate is viewed in FIG. 19. However, the pin 276 limits the counter clockwise rotation of the plate 266, thereby normally holding that plate in the position shown by FIG. 19. The springs 274 can yield to permit the plate 266 to be rotated in the clockwise direction; and the pin 276 and the slot 270 will permit a limited amount of such rotation.

The plate 254 coacts with the upstanding front edge of the U-shaped closure 260 to define the sides of a recess; and the flange 272 on the plate 266 normally closes the top of that recess. The bottom of that recess is open, and it is normally held in register with the outlet end of the currency storage tube defined by plates 130 and 134 and by wall 184. The Negator springs 173 will normally urge a dispensing tube 218 upwardly into that recess, and those springs will normally hold further dispensing tubes 218 in readiness to enter that recess.

When one of the dispensing tubes 218 is to be ejected, a suitable actuator, not shown, will rotate the U-shaped member in the counter clockwise direction relative to the pivot 252. The front edge of the U-shaped closure 260 will engage the uppermost dispensing tube 218 and will force that tube to move to the right in FIG. 19; and that closure will force that tube to move beyond the top of the wall 184 and beyond the top of the inclined surface 242. As that dispensing tube does so, that dispensing tube will become unsupported and will fall downwardly past the inclined surface 242 and past the frame member 240 to a money receptacle, not shown. That money receptacle will suitably open to the exterior of the money-dispensing machine so patrons can reach in and pick up dispensing tubes entering that receptacle. Thereafter, the U-shaped member will be suitably returned to the position shown by FIG. 19; and thereupon a further dispensing tube 218 will be moved up into the recess defined by plate 254, flange 272 and closure 260.

As the U-shaped member was rotated in the counter clockwise direction, the closure 260 moved into position above the next uppermost dispensing tube 218; and in doing so it prevented the release of any of the dispensing tubes 218 held within the currency storage tube. As the U-shaped member was returned to the position shown by FIG. 19, the closure 260 uncovered the outlet end of the currency storage tube and thereby permitted the next dispensing tube 218 to move up into the recess within the U-shaped member.

When it is necessary or desirable to insert further dispensing tubes 218 into the currency storage tube, that currency storage tube will usually be removed bodily from the money-dispensing device; and, as that currency storage tube is so removed, the closure member 176 will respond to the spring 182 to automatically move into position to cover the outlet end of that currency storage tube. That closure member was automatically moved to uncovering position by the engagement of ear 180 with pin 248 as the currency storage tube was bodily moved toward the rear face of the frame member 240. That ear engaged that pin immediately before the openings 150 in the brackets 148 started telescoping over the reduced-diameter rear ends of the pins 244; and by the time those openings were fully telescoped over those reduced-diameter rear ends, the closure member 176 had been rotated to the uncovering position shown by FIG. 19. In this way, the closure member 176 automatically moves to covering position, and thereby automatically prevents the escape of dispensing tubes 218, whenever the currency storage tube is separated from the money-dispensing device; and that closure member automatically moves to uncovering position, and thereby automatically makes the dispensing tubes 218 available, whenever the currency storage tube is mounted within the money-dispensing device.

In some instances, just a few dispensing tubes 218 need be inserted within the currency storage tube to completely fill that currency storage tube; and the pivot 264 and the plate 266 make it possible to insert those dispensing tubes without any need of removing the currency storage tube. All that need be done is to lay a dispensing tube 218 in the generally V-shaped area between the upper portions of the plates 254 and 266 and to press downwardly on that dispensing tube. That tube will cause the plate 266 to rotate in the clockwise direction about the pivot 264, thereby permitting that dispensing tube to move down into engagement with the dispensing tube held within the recess defined by plate 254, flange 272 and closure 260. Further downward movement of the freshly inserted dispensing tube will force the lower dispensing tubes 218 further down relative to the currency storage tube. Those lower dispensing tubes 218 will be unable to escape because they will be confined by the currency storage tube or by the front edge of closure 260 and the lower portion of plate 254. Successive dispensing tubes 218 can easily be inserted in this manner; and after the last such tube has been inserted, the plate 266 will respond to the springs 274 to move its flange 272 into position to block the escape of the dispensing tubes 218.

In FIGS. 17–20, the paper currency has been rolled or folded and disposed within cylindrical tubes 218; and the ends of the currency project beyond the ends of those tubes so that currency can be easily grasped and removed from the said tubes. Those tubes can be omitted if the paper bills are rolled up to simulate those tubes and are then held in rolled form by rubber bands or the like.

Whereas the drawing and accompanying description have shown and described two preferred embodiments of the present invention, it should be apparent to those skilled in the art that various changes may be made in the form of the invention without affecting the scope thereof.

What we claim is:

1. A device that can dispense paper currency held in dispensing cylinders and that comprises a tube, a platform that is disposed within said tube and that is movable relative to said tube, a plurality of pulleys adjacent the top of said tube, a plurality of pulleys adjacent the bottom of said tube, a plurality of flexible cords that are connected to said platform and that pass over said pulleys, at least one of said cords being adjacent one side of the interior of said tube and constituting a substantially closed loop, two of said cords being adjacent the opposite side of said interior of said tube and constituting substantially closed loops, said cords being spaced inwardly from said interior of said tube to be adapted to engage said dispensing cylinders and thereby hold said dispensing cylinders away from said interior of said tube, said cords moving as said platform moves whereby said cylinders do not have to move relative to the surfaces which said cylinders contact, said two cords being spaced from each other in one direction transversely of the axis of the tube and coacting to define a plane within said tube, said one cord being spaced from said plane a distance substantially equal to the diameter of any one of said dispensing cylinders so said cords can provide three-point support for said cylinders, a spring that biases said platform toward the outlet end of said tube, and a finger-receiving projection on said platform that can be used to move said platform away from said outlet end of said tube despite said spring, the pulley for the upper end of said one cord being displaced vertically from the pulleys for the upper ends of said two cords.

2. A device that can dispense paper currency held in dispensing cylinders and that comprises a tube, a platform that is disposed within said tube and that is movable relative to said tube, a plurality of pulleys adjacent the top of said tube, a plurality of pulleys adjacent the bottom of said tube, a plurality of flexible cords that are connected to said platform and that pass over said pulleys, at least one of said cords being adjacent one side of the interior of said tube, at least one other cord being adjacent the opposite side of said interior of said tube, said cords being spaced inwardly from said interior of said tube to be adapted to engage said dispensing cylinders and thereby hold said dispensing cylinders away from said interior of said tube, there being a sufficient number of said cords to provide the principal resistance to lateral displacement of said dispensing cylinders throughout the major portion of the movement of said platform, two of said cords being spaced from each other in one direction transversely of the axis of the tube and coacting to define a plane within said tube, another of said cords being spaced from said plane a distance substantially equal to the diameter of any one of said dispensing cylinders, said cords moving as said platform moves whereby said cylinders do not have to move relative to the surfaces which said cylinders contact, and a spring that biases said platform toward the outlet end of said tube, said cords having loop-like configurations, said cords enabling said dispensing cylinders to be assembled and held in an upright stack which has insufficient lateral stability to remain upright without the support supplied by said cords.

3. A device that can dispense paper currency and that comprises a tube, a platform that is disposed within said tube and that is movable relative to said tube, a plurality of pulleys adjacent the top of said tube, a plurality of pulleys adjacent the bottom of said tube a plurality of flexible cords that are connected to said platform and that pass over said pulleys, at least one of said cords being adjacent one side of the interior of said tube, at least one other cord being adjacent the opposite side of said interior of said tube, said cords moving as said platform moves whereby said currency does not have to move relative to the surfaces which are adapted and intended to be contacted by said currency, there being a sufficient number of said cords to provide the principal resistance to lateral displacement of said currency throughout the major portion of the movement of said platform, two of said cords being spaced from each other in one direction transversely of the axis of the tube and coacting to define a plane within said tube, another of said cords being spaced from said plane a distance substantially equal to the diameter of any one of the units of said currency, and a spring that biases said platform toward the outlet end of said tube, said cords enabling said currency to be assembled and held in an upright stack which has insufficient lateral stability to remain upright without the support supplied by said cords.

4. A device that can dispense light weight objects and that comprises a tube, a platform that is disposed within said tube and that is movable relative to said tube, and a plurality of flexible cords that are connected to said platform and that extend from said platform toward the outlet end of said tube, at least one of said cords being adjacent one side of the interior of said tube, at least one other cord being adjacent the opposite side of said interior of said tube, said cords being adapted to hold said objects away from said interior of said tube, there being a sufficient number of said cords to provide the principal resistance to lateral displacement of said objects throughout the major portion of the movement of said platform, two of said cords being spaced from each other in one direction transversely of the axis of the tube and coacting to define a plane within said tube, another of said cords being spaced from said plane a distance substantially equal to the diameter of any one of said objects, said cords moving as said platform moves whereby said objects do not have to move relative to the surfaces which said objects contact, said cords enabling said objects to be assembled and held in an upright stack which has insufficient lateral stability to remain upright without the support supplied by said cords.

5. In a money storage tube that has an outlet end, a platform that is disposed within said tube and that is movable axially of said tube, a helical compression spring that is disposed within said tube, a second helical compression spring that is disposed within said tube, said helical compression springs being coaxial and being mounted in tandem relation, a rotatable element interposed between one end of one of said springs and one end of said tube, a set of interacting surfaces on said one end of said one spring and on said rotatable element that causes said rotatable element to rotate with said one end of said one spring, a second set of interacting surfaces on said one end of said tube and on said rotatable element that permits said rotatable element to rotate freely relative to said one end of said tube, a second rotatable element interposed between one end of the other of said springs and said platform, a third set of interacting surfaces on said one end of said other spring and on said second rotatable element that causes said second rotatable element to rotate with said one end of said other spring, a fourth set of interacting surfaces on said second rotatable element and on said platform that permits said second rotatable element to rotate freely relative to said platform, a pair of relatively rotatable elements interposed between the adjacent ends of said springs, a fifth set and a sixth set of interacting surfaces on said adjacent ends of said springs and on said pair of relatively rotatable elements that cause said pair of relatively rotatable elements to rotate with said adjacent ends of said springs, and a seventh set of interacting surfaces on said pair of relatively rotatable elements that permits said pair of relatively rotatable elements, and hence said adjacent ends of said springs, to rotate freely relative to each other, said rotatable elements and said pair of relatively rotatable elements and said interacting surfaces enabling said springs to rotate freely relative to each other and relative to said platform and said tube, as said springs are compressed, rather than bind against said platform and said one end of said tube and the interior of said tube.

6. In a money storage tube that has an outlet end, a platform that is disposed within said tube and that is movable axially of said tube, a helical compression spring that is disposed within said tube, a second helical compression spring that is disposed within said tube, said helical compression springs being coaxial and being mounted in tandem relation, a pair of relatively rotatable elements interposed between the adjacent ends of said springs, a set of interacting surfaces between one of said relatively rotatable elements and the adjacent end of one of said springs that causes said one relatively rotatable element to rotate with said adjacent end of said one spring, a second set of interacting surfaces between the other of said relatively rotatable elements and the adjacent end of the other of said springs that causes said other relatively rotatable element to rotate with said adjacent end of said other spring, and a third set of interacting surfaces between said relatively rotatable elements that permits said relatively rotatable elements, and hence said adjacent ends of said springs, to rotate freely relative to each other, said relatively rotatable elements and said interacting surfaces enabling said springs to rotate freely relative to each other and relative to said platform and said tube, as said springs are compressed, rather than bind against the interior of said tube.

7. The combination of a money-storage device and a money-dispensing device comprising a money-storage tube that is adapted to be mounted within said money-dispensing device and that has an outlet end, a platform that is disposed within said tube and that is movable axially of said tube, a spring that is disposed within said tube and that urges said platform toward said outlet end of said tube, a closure that is movable into position adjacent to and in register with said outlet end of said tube and that is also movable out of register with said outlet end of said tube, said closure blocking the discharge of money from said outlet end of said tube whenever said closure is in said position adjacent to and in register with said outlet end of said tube, said closure permitting the discharge of money from said outlet end of said tube when said closure is out of register with said outlet end of said tube, and interacting surfaces on said closure and on said money-dispensing device that lock said money storage tube to said money-dispensing device as said closure is moved out of register with said outlet end of said tube during the assembling of said money-storage tube with said money-dispensing device, said interacting surfaces on said closure and on said money-dispensing device enabling said closure to move into said position adjacent to and in register with said outlet end of said tube as said money storage tube is unlocked from said money-dispensing device.

8. In a money storage tube that is adapted to supply coins in stacked array to a coin ejector and that has an outlet end, a platform that is disposed within said tube and that is movable axially of said tube, a spring that urges said platform toward said outlet end of said tube, a closure that has a plate-like portion which is movable into position in register with said outlet end of said tube and that locks said money-storage tube to said money-dispensing device as said closure is moved out of register with said outlet end of said tube during the assembling of said money-storage tube with said money-dispensing device, said plate-like portion of said closure overlying the major part of said outlet end of said tube and thereby blocking the discharge of money from said outlet end of said tube whenever said plate-like portion of said closure is in said position in register with said outlet end of said tube, and said closure permitting the discharge of money from said outlet end of said tube when said plate-like portion of said closure is out of register with said outlet end of said tube.

9. A money storage tube that is adapted to be mounted within and to be removed from a money-dispensing device, said tube having an open upper end, a closure that is movable into position in register with said open upper end of said tube and that also is movable out of register with said open upper end of said tube, said closure spanning the space between opposite sides of said open upper end of said tube and overlying a substantial portion of said open upper end of said tube whenever said closure is in register with said open upper end of said tube, a platform that is disposed within and movable relative to said tube, and that underlies and supports money within said tube, a spring that urges said platform and the money supported thereby toward said open upper end of said tube and hence toward said closure whenever said closure is in register with said open upper end of said tube, said closure being movable out of reigster with said open upper end of said tube to permit said spring and said platform to discharge money from said open upper end of said tube, said spring and said platform urging the uppermost unit of money against said closure whenever said closure is in register with said open upper end of said tube thus resisting movement of said closure out of register with said open upper end of said tube, and surfaces on said tube that are adapted to cooperate with surfaces on said money dispensing device to insure that said closure is out of register with said open upper end of said tube when said tube is mounted within said money-dispensing device, the spring-induced force between said uppermost unit of money and said closure tending to help prevent accidental movement of said closure out of register with said open upper end of said tube but permitting movement of said closure out of register with said open upper end of said tube as said tube is mounted within said money-dispensing device.

10. In a money storage tube that has an outlet end, a closure that has a portion which is movable into position in register with said outlet end of said tube and that is also movable out of register with said outlet end of said tube, said portion of said closure overlying the major part of said outlet end of said tube and thereby blocking the discharge of money from said outlet end of said tube whenever said portion of said closure is in said position in register with said outlet end of said tube, said closure permitting the discharge of money from said outlet end of said tube when said portion of said closure is out of register with said outlet end of said tube, said closure having an opening therein which will be in register with said outlet end of the tube and which will permit coins to pass through said opening when said portion of the closure is out of register with the outlet end of the tube, abutment means normally disposed within an extension of said opening in the closure when said opening is in register with the outlet end of the tube, said abutment lying within the path of movement of the closure and effective when a coin within the tube is disposed within said opening to block movement of the closure to a position in which the opening in the closure is out of register with the outlet end of the tube by reason of engagement of said coin with said abutment.

11. An ejector for a money dispensing device that is movable relative to a money storage tube to be adapted to effect the dispensing of money from said tube and that has a portion thereof that normally overlies said money storage tube and thereby normally prevents the issuance of money from said money dispensing device, said portion being bodily movable with said ejector to be adapted to effect the issuance of money from said money dispensing device but being movable out of register with said money storage tube while said ejector remains in register with said money storage tube, thereby facilitating the loading of said money storage tube while said ejector is in register with said money storage tube.

12. An ejector for a money dispensing device that is movable relative to a money storage tube to be adapted to effect the dispensing of money from said tube and that has a portion thereof that normally overlies said money storage tube and thereby normally prevents the issuance of money from said money dispensing device, said portion being bodily movable with said ejector to be adapted to effect the issuance of money from said money dispensing device but being movable out of register with said money storage tube while said ejector remains in register with said money storage tube, thereby facilitating the loading of said money storage tube while said ejector is in register with said money storage tube, said portion being spring-biased into register with said money storage tube but being movable against said bias, said portion and another portion of said ejector normally defining a generally V-shaped recess in which money is adapted to be inserted, the first said portion being movable relative to said other portion to widen the bottom of said recess and thereby be adapted to permit said inserted money to pass into said money storage tube.

13. In a money storage tube that is adapted to be mounted within a money dispensing device having a notch, said storage tube having an outlet end and a closure that is movable into position in register with said outlet end of said tube and that is also movable out of register with said outlet end of said tube, said closure blocking the discharge of money from said outlet end of said tube whenever said closure is in said position in register with said outlet end of said tube, said closure permitting the discharge of money from said outlet end of said tube when said closure is out of register with said outlet end of said tube, and an ear on said closure that is adapted to register with said notch whenever said tube is mounted in assembled relation with said money dispensing device, said ear being movable with said closure and being engageable with said notch to lock said money storage tube in position within said money dispensing device as said closure is moved out of register with said outlet end of said tube, said ear being separable from said notch to free said money storage tube from said money dispensing device as said closure moves to said position in register with said outlet end of said tube.

References Cited in the file of this patent

UNITED STATES PATENTS

| | | |
|---|---|---|
| 494,346 | Pierce | Mar. 28, 1893 |
| 658,828 | Brandt | Oct. 2, 1900 |
| 1,123,296 | Hibner | Jan. 5, 1915 |
| 1,197,577 | Gove | Sept. 5, 1916 |
| 1,605,496 | Barbieri | Nov. 2, 1926 |
| 1,622,262 | Kindrat | Mar. 22, 1927 |
| 1,637,549 | Chandler | Aug. 2, 1927 |
| 1,638,010 | Fausek | Aug. 9, 1927 |
| 1,881,894 | Olsen | Oct. 11, 1932 |
| 2,229,928 | Morrison | Jan. 28, 1941 |
| 2,284,225 | Norris | May 26, 1942 |
| 2,397,403 | Bishop | Mar. 26, 1946 |
| 2,498,150 | Brahe | Feb. 21, 1950 |
| 2,518,894 | Humbarger | Aug. 15, 1950 |
| 2,524,462 | Miller | Oct. 3, 1950 |
| 2,720,336 | Kosar | Oct. 11, 1955 |
| 2,805,675 | Noyes | Sept. 10, 1957 |
| 2,891,568 | Gaffney | June 23, 1959 |
| 2,955,724 | Deucher | Oct. 11, 1960 |

FOREIGN PATENTS

| | | |
|---|---|---|
| 3,969 | Great Britain | of 1878 |